United States Patent [19]

Walters

[11] Patent Number: 4,491,305

[45] Date of Patent: Jan. 1, 1985

[54] AUTOMOBILE DOLLY

[76] Inventor: Charles J. Walters, 65850 Hartway Rd., Romeo, Mich. 48065

[21] Appl. No.: 412,082

[22] Filed: Aug. 27, 1982

Related U.S. Application Data

[63] Continuation-in-part of Ser. No. 222,581, Jan. 5, 1981, Pat. No. 4,383,681.

[51] Int. Cl.³ .............................................. B66F 5/04
[52] U.S. Cl. ..................................... 269/17; 269/47; 269/58
[58] Field of Search ...................... 414/426, 427, 429; 280/638, 659, 79.1 R, 79.1 A; 269/17, 47, 296, 52, 69, 58; 254/2 R, 2 B, 133, 133 A, 134, 421

[56] References Cited

U.S. PATENT DOCUMENTS

| | | |
|---|---|---|
| 949,331 | 2/1910 | Scholle . |
| 1,114,829 | 10/1914 | Weaver . |
| 1,398,132 | 11/1921 | Healy ................................ 254/421 |
| 2,012,430 | 8/1935 | Kuhlman ............................ 254/2 B |
| 2,369,603 | 2/1945 | Phillips ............................... 254/2 R |
| 2,581,137 | 1/1952 | Pelouch ........................... 254/133 R |
| 3,740,020 | 6/1973 | Arnes ................................ 254/2 B |
| 3,850,419 | 11/1974 | Craig . |
| 3,949,976 | 4/1976 | Cofer . |

Primary Examiner—Robert C. Watson
Attorney, Agent, or Firm—Basile, Weintraub & Hanlon

[57] ABSTRACT

An automobile dolly for supporting the front end of a front wheel drive vehicle during transmission repair having a wheel supported frame sufficiently narrow to pass between the tracks of a vehicle hoist. In one embodiment front and rear tubular transverse supports are attached to the frame and spaced inward from and above the tracks, each support having a pair of opposed transversely adjustable sleeves telescopically engaging the tubular transverse supports and adapted for projecting over the tracks when positioned between the same. A vertically adjustable support member is attached to each opposed front sleeve and configured to abut and support the vehicle. In a second embodiment the frame pivotally mounts a single transverse support which includes adjustable sleeves adapted to telescopically project over the tracks. The sleeves have vertical support members for receiving and supporting the frame of the vehicle to permit the vehicle to be moved by means of the dolly.

5 Claims, 10 Drawing Figures

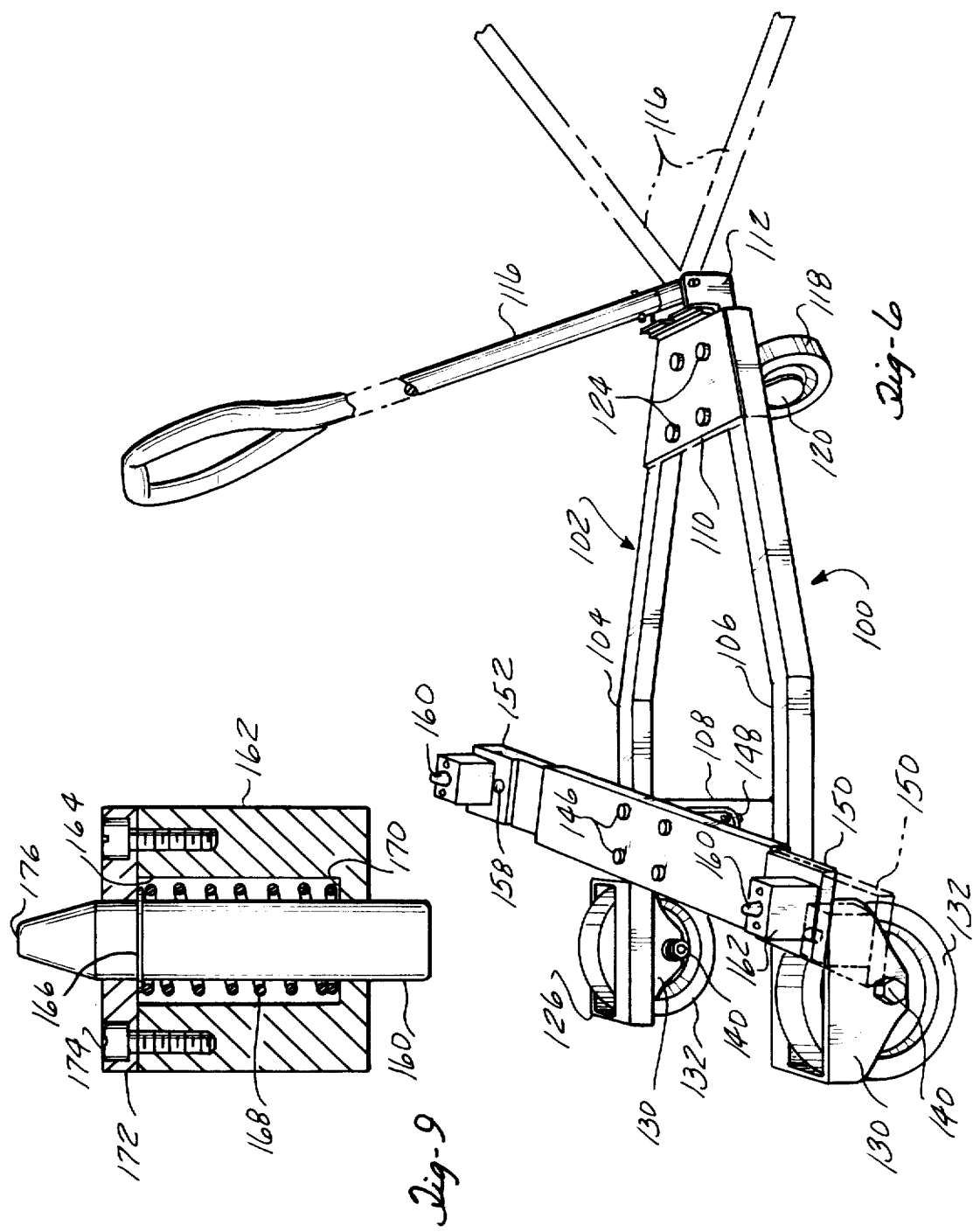

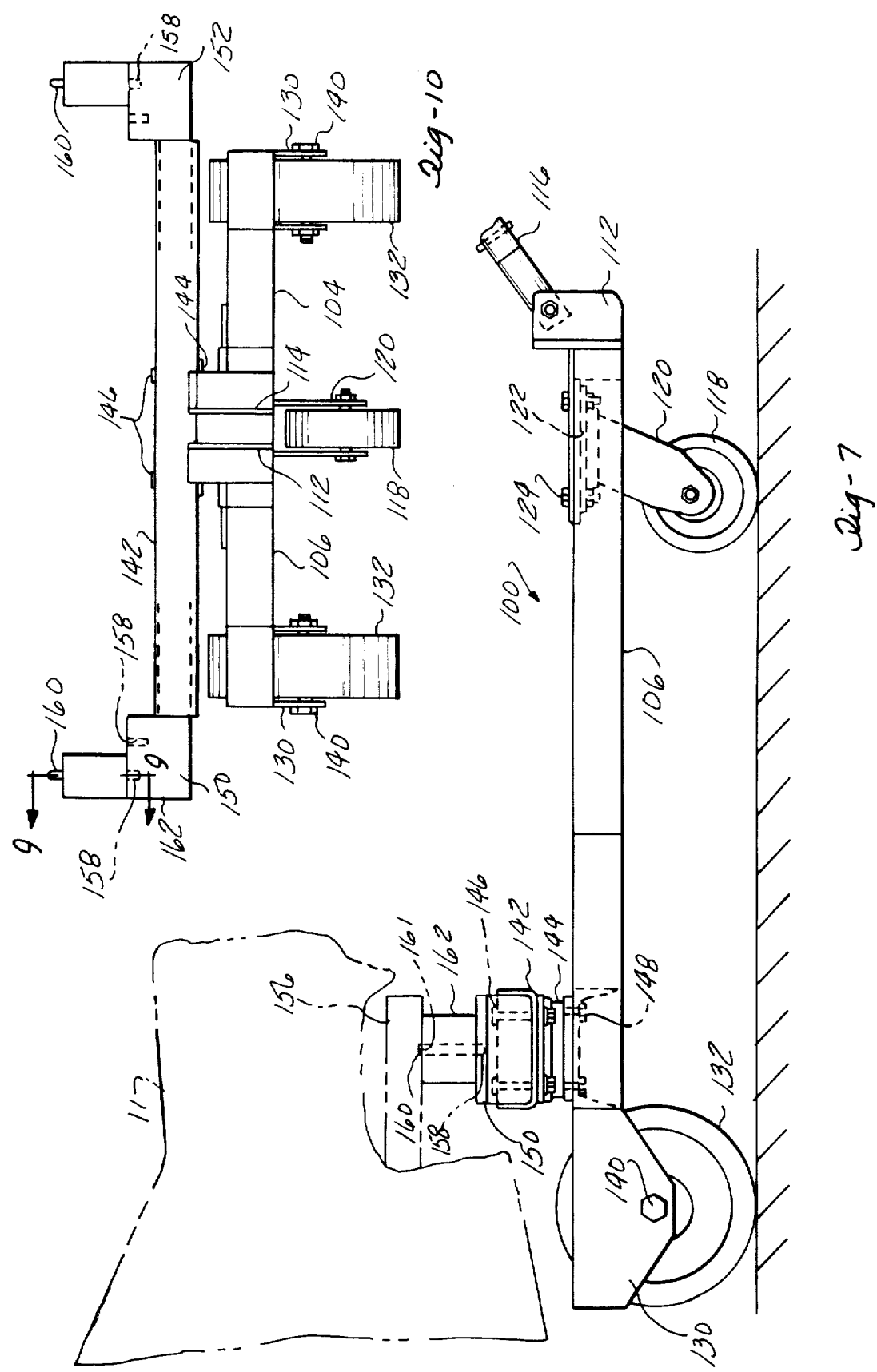

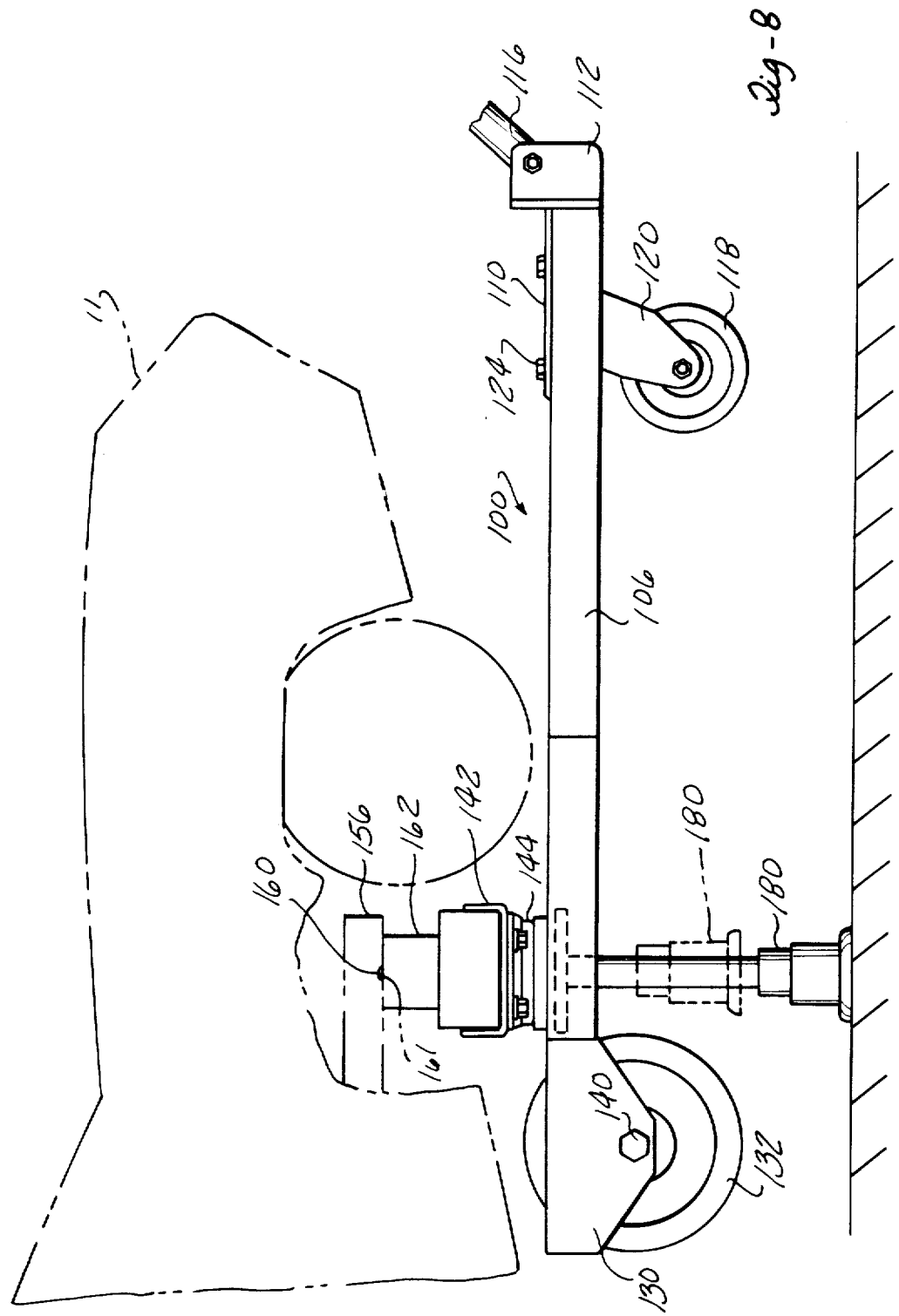

4,491,305

AUTOMOBILE DOLLY

CROSS REFERENCE TO RELATED PATENT APPLICATIONS

The present application is a continuation-in-part application of co-pending U.S. patent application Ser. No. 222,581 filed Jan. 5, 1981, in the name of Charles J. Walters for an "Automobile Dolly", now U.S. Pat. No. 4,383,681 issued on May 17, 1983.

BACKGROUND OF THE INVENTION

I. Field of the Invention

The present invention generally relates to dollies for facilitating vehicle repair. In particular, the present invention is concerned with a dolly for supporting the front end of an automobile to permit the movement of the automobile when its transmission has been removed.

II. Prior Art Statement

Hoists, workholders and dollies for transporting a variety of items are well known in the prior art. Examples of prior art devices include the following.

U.S. Pat. No. 1,114,829 issued to Weaver discloses a movable jack comprising a triangular frame on which is located a vertically adjustable support.

U.S. Pat. No. 949,331 issued to Scholle discloses a multiple lifting jack in which the lifting force is obtained by a plurality of jack members carried by a single movable frame.

U.S. Pat. No. 3,949,976 issued to Cofer discloses a tractor stand having a rectangular frame with two vertically adjustable forward members and one vertically adjustable rear member and wherein the frame is movable.

U.S. Pat. No. 3,850,419 issued to Craig discloses a tractor splitter having an adjustable vertical support frame.

The aforementioned prior art in the opinion of applicant and applicant's attorney represents the closest prior art of which the applicant and his attorney are aware. In addition to the aforementioned patents, other examples of less relevant prior art are disclosed in U.S. Letters Pat. Nos. 2,790,232, 2,904,308, 3,085,798, 3,727,903, 4,177,978, 3,740,020, 2,505,583, 3,830,470, 1,016,381, 3,302,927 and 4,123,038 and Italian Pat. No. 415,835.

DESCRIPTION OF THE PRIOR ART

Today, many automobiles are manufactured with the engine mounted in the forward end of the car and the car being driven by a front-wheel drive arrangement. When the transmission of a vehicle of this type is under repair, the front wheel assembly must be disconnected or substantially disengaged so that the front wheels of the automobile are unable to support the automobile, rendering it immovable. In repairing such automobiles, it is normal for the car to remain on the hoist until the removed transmission is repaired and replaced. This limits the amount of repair work that may be conducted in a transmission repair shop without the installation of additional and expensive hoists. The present invention eliminates this by providing an automobile dolly which facilitates the movement of the vehicle from the hoist while the transmission is being repaired.

SUMMARY OF THE INVENTION

The present invention, which will be described in greater detail hereinafter, comprises a dolly providing movement of a front-wheel drive automobile after its transmission has been removed. In one embodiment of the invention, the dolly comprises a wheel supported frame sufficiently narrow to pass between the tracks of a vehicle hoist. The frame includes front and rear tubular transverse supports spaced inward from and above the tracks when the dolly is positioned therebetween. Each support has a pair of opposed transversely adjustable sleeves telescopically engaging the tubular transverse supports and adapted for projecting over the tracks when the dolly is positioned thereinbetween. A vertically adjustable support member is attached to each opposed front sleeve and configured to abut and support the front end of the vehicle in an elevated position. In a second embodiment of the invention the automobile dolly comprises a frame pivotally mounting a single transverse support which includes outwardly adjustable sleeves adapted to telescopically project over the hoist tracks when the dolly is positioned thereinbetween. The sleeves have vertical support members for receiving and supporting the frame of the vehicle to permit the vehicle to be moved by means of the dolly when its transmission has been removed. The dolly includes hydraulically actuated means elevating the dolly and front end of the automobile to permit the automobile to be removed from the dolly and mounted on stationary jacks.

It is therefore a primary object of the present invention to provide a new and improved dolly to facilitate the repair of front-wheel drive vehicle transmissions by allowing the front end of a front-wheel drive vehicle to be supported in such a manner that the vehicle can be freely moved after its transmission has been removed.

It is a further object of the present invention to support the front end of a front-wheel drive vehicle undergoing transmission repair and allow the vehicle to be removed from the repair hoist to free the hoist for other transmission repair work.

Further objects, advantages and applications of the present invention will become apparent to those skilled in the art of automobile dollies particularly adapted for use in facilitating the repair of front-wheel drive vehicle transmissions when the accompanying descriptions of several examples of the best modes contemplated for practicing the invention are read in conjunction with the accompanying drawings.

BRIEF DESCRIPTION OF THE DRAWINGS

The description herein makes reference to the accompanying drawings wherein like reference numerals refer to like components throughout the several views, and in which:

FIG. 6 is a perspective view of a second example of an automobile dolly constructed in accordance with the principles of the present invention;

FIG. 7 is a side elevational view of the dolly illustrated in FIG. 6 with an automobile shown in phantom lines in an elevated position;

FIG. 8 is a side elevational view of the dolly similar to FIG. 7 with the dolly being raised hydraulically above the ground surface;

FIG. 9 is a fragmentary cross-sectional view as seen on line 9—9 of FIG. 10; and FIG. 10 is a front view of the dolly illustrated in FIG. 6 with the handle removed.

DESCRIPTION OF THE PREFERRED EMBODIMENTS

Figure 1:
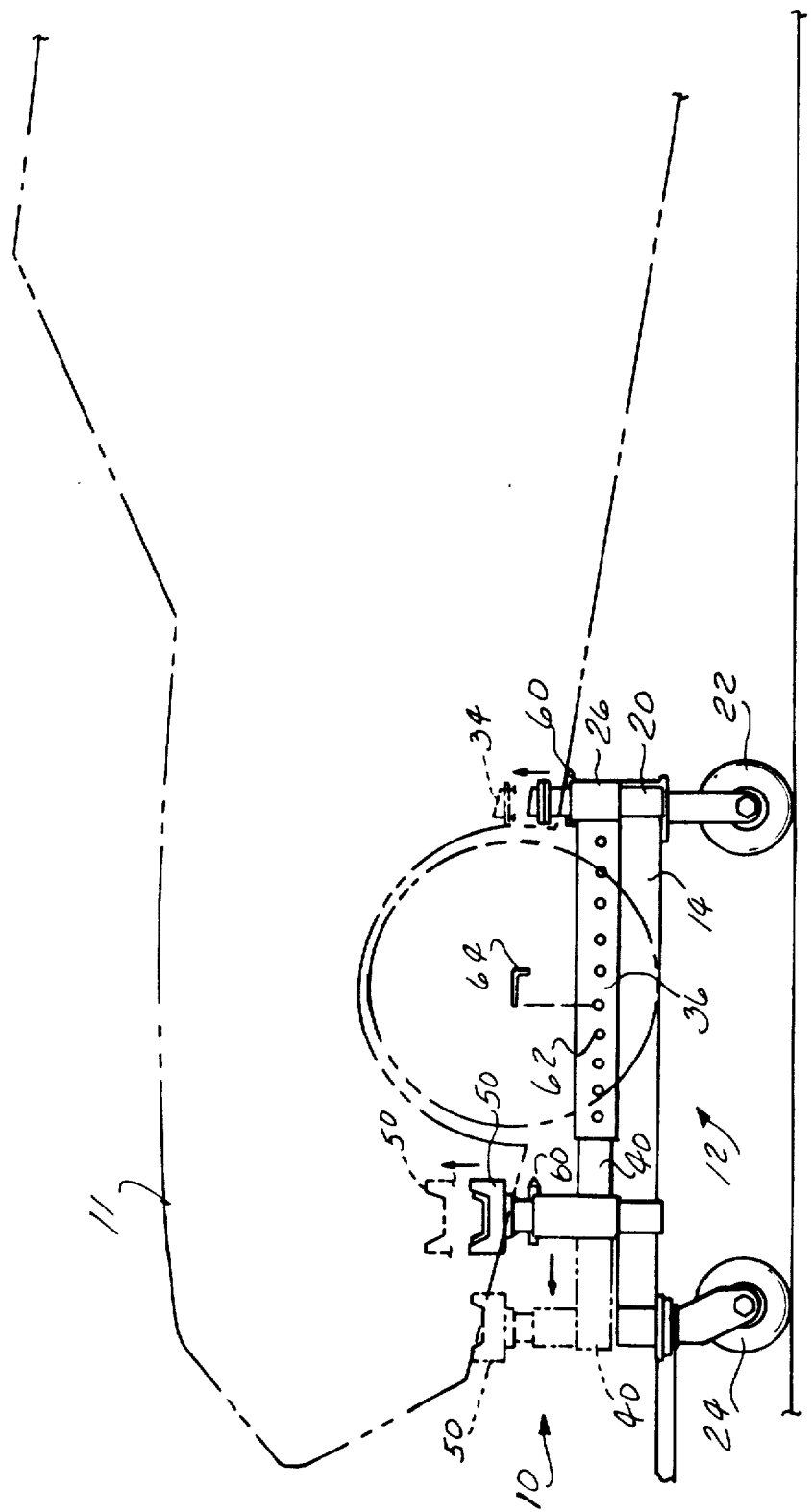
FIG. 1 is a side view of a dolly shown supporting an automobile front end, the dolly being constructed in accordance with the principles of the present invention.
Figure 2:
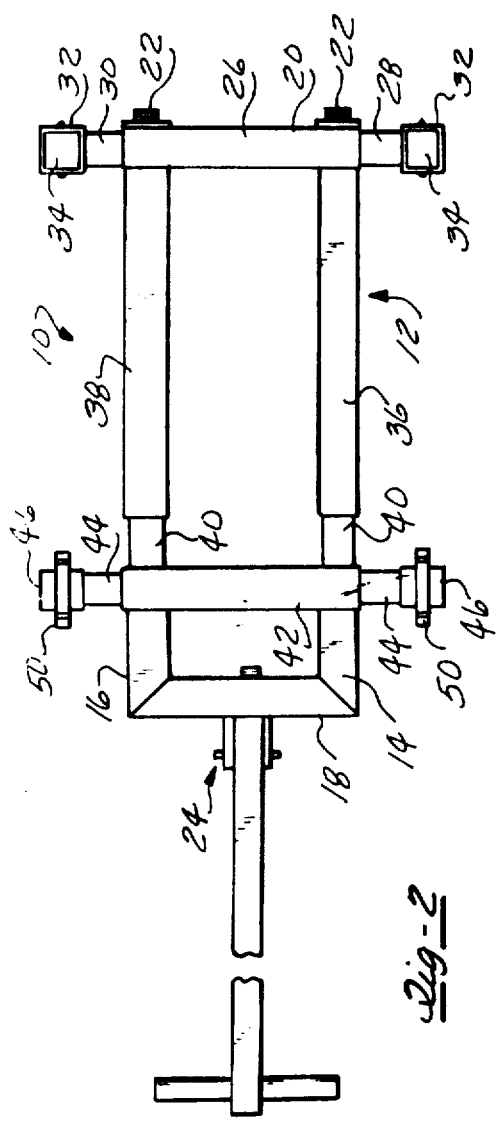
FIG. 2 is a top plan view of the dolly illustrated in FIG. 1.
Figure 3:
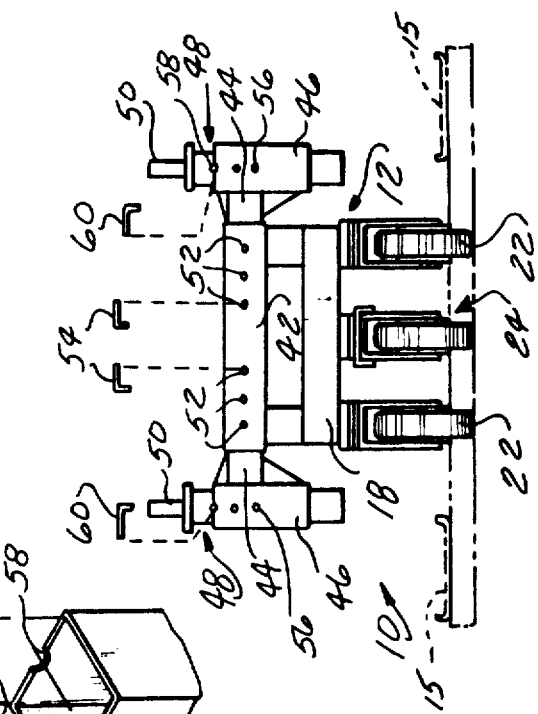
FIG. 3 is a front view of the dolly illustrated in FIG. 1.

Referring now to the drawings and, in particular, to FIGS. 1, 2 and 3, there is illustrated one example of the present invention in the form of an automobile dolly 10 adapted to support the front end of a front-wheel drive vehicle 11 undergoing transmission repair. The automobile dolly 10 comprises a base frame 12 including a pair of spaced apart longitudinal members 14 and 16, a front transverse member 18 and a rear transverse member 20 extending between longitudinal members 14 and 16. The longitudinal members and the front and rear transverse members are co-joined to form the frame 12 with an open center. A pair of longitudinally aligned, spaced apart wheels 22 are fixed to the ends of the rear transverse member 20, while a pivotable castor wheel 24 is centrally attached to the front transverse member 18 allowing the dolly 10 to be rolled along the floor. The wheels 22 and 24 are configured to pass between the tracks 15 of a conventional hoist for supporting the vehicle.

A rear tubular transverse support 26 rests upon and is affixed to the spaced longitudinal members 14 and 16, and a pair of opposed transversely adjustable rear sleeves 28 and 30 are telescopingly engageable with the rear transverse tubular support 26. A rear vertical tube 32 is attached to the outer end of each rear sleeve 28 and 30. A rear support 34 is telescopingly engaged with each rear vertical tube 32 and is configured to adjustably overlay the tracks 15.

A pair of longitudinal tubes 36 and 38 respectively overlay each member 14 and 16 in parallel abutment. The longitudinal tubes 36 and 38 extend from the transverse support 26 to a point short of the front transverse member 18. A pair of longitudinal sleeves 40 telescopingly engage the longitudinal tubes 36 and 38 and a front transverse tube 42 extends across the longitudinal sleeves 40 to join them into a U-shaped piece telescopingly engageable with the longitudinal tubes 36, 38. A pair of opposed transversely adjustable front sleeves 44 telescopingly engage the ends of the front transverse tube 42, and a front vertical tube 46 is attached to an outer end of each front transverse sleeve 44. A front support 48 telescopingly engages each front vertical tube 46, and a front support member 50 is releasably attached to an upper end of each front support 48.

Means are provided for selectively adjusting the spacing between the front and rear support members. The means comprise a plurality of transversely spaced apertures 52 formed in an outer end of the front tubular transverse support 42 and the rear tubular transverse support 26. An aperture (not shown) is formed in each front and rear transverse sleeve 44, 28 and 30 and is configured to selectively align with one of the corresponding plurality of transversely spaced apertures 52, and a first pin 54 is engageable with the aligned apertures to secure the front and rear transverse sleeves in place.

Means for selectively adjusting the height of the front and rear support members 48 and 34 is provided and comprises a plurality of vertically spaced apertures 56 formed in each front vertical sleeve 44 and each rear vertical sleeve 28 and 30. A half round recess 58 is formed along an upper edge of each front vertical tube 46 and each rear vertical tube 32 and is configured to selectively align with the plurality of vertically spaced apertures 56, and a second pin 60 is provided for each sleeve to slidingly engage the corresponding vertically spaced aperture and rest upon the recess 58 to secure the front and rear vertical sleeves in position.

Means are provided for selectively adjusting the spacing between the front support members and the rear support members and comprise a plurality of longitudinally spaced apertures 62 formed in each of the longitudinal tubes 36 and 38, and an aperture (not shown) formed in each of the longitudinal sleeves 40 and configured to selectively align with a corresponding aperture among the plurality of apertures 62, and a third pin 64 is provided to slidingly engage the aligned apertures to secure the corresponding longitudinal sleeve to its telescopingly mated longitudinal tube.

Figure 4:
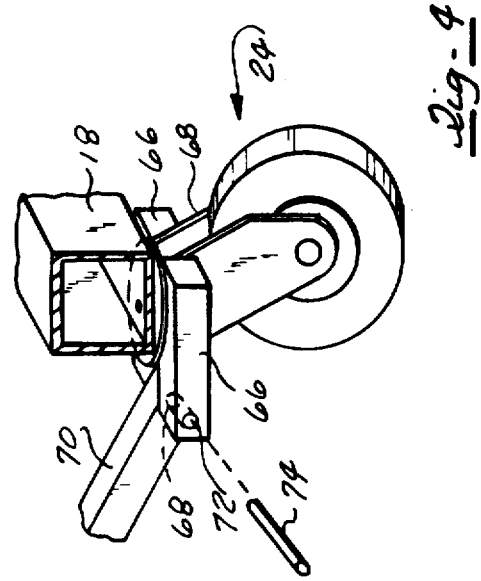
FIG. 4 is a fragmentary perspective view of a pivotable castor wheel utilized in the dolly illustrated in FIG. 1.

Referring now to FIG. 4 of the drawing, a pair of spaced apart, forward extending rails 66 are attached to the castor 68 of the pivotable castor wheel 24. A towing tongue 70 is inserted between rails 66 and an aperture 68 formed in the towing tongue 70 is aligned with a pair of apertures 72 in the rails 66. A pin 74 engages the aligned apertures to hingedly join the towing tongue 70 to the castor 68 and allows the pivoting castor wheel to be steerable and towable by means of the towing tongue.

Figure 5:
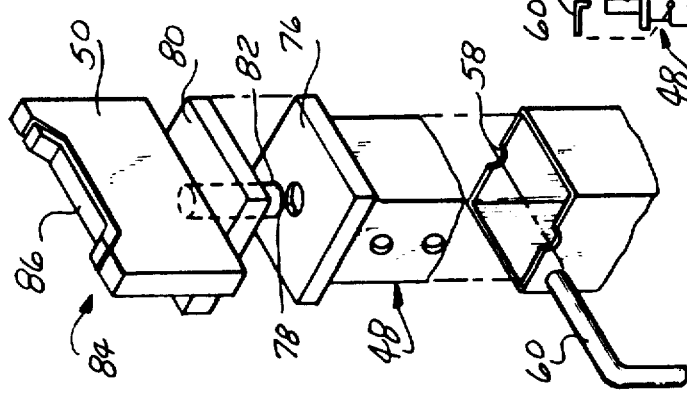
FIG. 5 is a fragmentary exploded perspective view of the front support of the dolly illustrated in FIG. 1.

Referring now to FIG. 5 of the drawing, a cap 76 covers an upper end of each front and rear support 48 and 34 and has an opening 78 formed centrally therein. The cap 76 projects horizontally over the support to which it is attached to prevent the support from entering its mating tube too far and dropping through the tube. A flange 80 is provided complementary to the cap and is carried by each front and rear support member. A dowel 82 projecting from the flange 80 engages the opening 78 to secure the flange 80 in position when in use but provides an easy means for removing the flange 80 and substituting a different support member 50 having a contour more suited to the shape of the vehicle 11 to be supported. In a preferred embodiment a complementary projection 84 is attached to the flange 80 to abut the body or frame of the vehicle to be supported, and a fabric pad 86 is attached to the complementary projection 84 to aid in securing the projection 84 in abutment with the vehicle without scratching or otherwise marring the vehicle. It can be readily appreciated by the skilled artesian that a large variety of complementary projections 84 can be provided for the various vehicles to be mounted on the dolly of the present invention.

Referring now to FIGS. 6–10 for a description of a second example of the present invention in the form of a dolly 100 which comprises an A-shaped frame 102 having leg members 104 and 106 connected at their mid-section by cross member 108 and at the apex by a connecting plate 110. The connecting plate 110 has attached thereto by any suitable fastening means a pair of outwardly extending flanges 112 and 114 (FIG. 10) which pivotally support a handle 116 used to facilitate the movement of the dolly 100. The connecting plate 110 further mounts a castor wheel 118 which is pivotally carried by means of a pair of flanges 120 and a bearing 122 to provide a simple steering means in a conventional manner. The bearing means 122 is attached to the connecting plate 110 by any suitable fasteners, such as a plurality of bolt and nut fasteners 124.

The extended rear ends of the legs 104 and 106 are outwardly enlarged to form wheel wells 126 and 128 respectively. Wheel wells 126 and 128 each have appropriately sized and downwardly depending flanges 130 which support a pair of wheels 132 for rotational movement about the nut and bolt axis 140. It can thus be seen that a pulling or pushing force exerted on the handle 116 permits the entire frame 102 and, as will be described hereinafter, the automobile 11 carried thereby to be moved forward or rearwardly and steered by means of the handle 116 and the pivotable wheel 118. As can best be seen in FIGS. 6 and 10, the cross member 108 pivotally supports a movable transverse cross member 142. The cross member 142 is attached to a support bearing 144 for rotational or pivotal movement about the vertical axis. The support bearing is, in turn, secured to the cross member 108. Cross member 142 is attached to the bearings by any suitable fastener, such as nut and bolt arrangement 146, while a similar nut and bolt arrangement 148 (FIG. 6) secures the bearing 144 to the cross member 108.

The movable cross member 142 is hollow and telescopically receives a pair of slidably mounted left and right vertical support members 150 and 152. As can best be seen in FIG. 6, the vertical support members 150 and 152 are movable laterally to provide for an adjustment of the position of the support members 150 and 152 with respect to the automobile frame 156 (see FIGS. 7 and 8). The frame is adapted to be engaged and supported by the vertical support members 150 and 152, as will be described in greater detail hereinafter.

Each of the support members 150 and 152 are provided with a plurality of apertures 158 that are adapted to receive the lower end portion of a locating pin 160 (FIG. 9). The locating pin 160 is carried in a mounting block 162 that is provided with an internal bore 164 within which the locating pin 160 is vertically displaceable. The locating pin 160 has a collar 166 which is adapted to compress a spring 168 disposed between the bottom surface of the collar 166 and the interior bottom wall 170 of the mounting block 162. Outward movement of the pin 160 is prevented by abutment of the top surface of the collar 166 with the interior wall of a cover 172 that is secured to the mounting block 162 by suitable fasteners, such as bolts 174. It can be seen that when a downward pressure is exerted against the top 176 of the pin 160, it will move downwardly compressing the spring 168 until the downward pressure is removed from the top of the pin 160 whereupon the spring 168 will move the pin 160 to the position illustrated in FIG. 9.

In use the dolly 100 is positioned under the front end of the automobile 11 as shown in FIG. 7 such that the cross member 142 is generally aligned with the vehicle frame 156. The mounting blocks 162 are positioned above the appropriate apertures 158 by means of the locating pin 160. The telescopic engagement of the members 150 and 152 with respect to the cross member 142 permits lateral adjustment so as to closely align the locating pins 160 with opposing apertures 161 in the automobile frame 156. The automobile which is mounted on the hoist is then lowered. Fine adjustment by movement of the members 150 and 152 with respect to the cross member 142 and rotation of the cross member 142 with respect to the frame 100 permits the locating pins 160 to be moved until they will be received by the appropriate aperture 161 in the frame 156. The automobile 11 is lowered to a position where it will actually exert a bias upon the locating pins 160 urging the same into their respective mounting block 162 until the pins are received by the appropriate apertures 161 in the automobile frame 156. In this position the hoist is then completely lowered and the automobile 11 may then be removed by means of manually pushing or pulling on the handle 116 of the dolly 100.

FIG. 8 illustrates an alternate version of the dolly 100 wherein the underside of the cross member 108 includes a hydraulically (or pneumatically) operated jack 180. The jack 180 is secured to the lower surface of the cross beam 108 by any suitable means, such as nuts and bolts (not shown). When it is desired, hydraulic fluid (or compressed air) is communicated to the jack 180 causing it to expand and engage the floor raising both the dolly 100 and the automobile above their initial position. This permits the resting of the automobile 11 on fixed, inexpensive supports which may be positioned under the automobile 11 after it has been raised by the jack 180. Once the appropriate fixed supports have been positioned, the jack 180 is lowered, permitting the automobile 11 to rest upon the supports. The dolly 100 can then be removed from beneath the automobile 11 and used to lift another automobile. This permits the simple and inexpensive storage of the automobile on fixed supports away from the hoist so that the hoist and the dolly may be used for other repair efforts. It should be noted that the jack 180, when in a retracted position, will be raised to the position shown in phantom lines which is a point above the bottom of the wheels 132.

It can thus be seen that the present invention provides a new and improved automobile dolly for transmission repair work which facilitates the removal of an automobile from a movable hoist and permits the readily transport of the car from place to place within a repair shop and the easy mounting of the automobile upon fixed supports.

It should be understood by those skilled in the art of dollies for automobiles that other forms of applicant's invention can be had, all coming within the spirit of the invention and the scope of the appended claims.

What is claimed is as follows.

1. An automobile dolly for supporting the front end of a vehicle comprising:
   a frame member;
   a front wheel;
   a pair of spaced rear wheels both spaced from the front wheel;
   means for pivotally mounting the front and rear wheels to said frame member to permit movement of said frame member;
   handle means secured to said frame member to control the movement of said frame member;
   a first cross member secured to said frame member between said front and rear wheels but in close proximity to said rear wheels;
   a second cross member pivotally carried by said first cross member for rotational movement about a vertical axis; and
   A pair of vertical support members telescopically received in the opposite ends of said second cross member to permit alignment of said vertical support members with a predetermined location on the frame of the vehicle to be supported by said dolly, alignment being had by the telescopic engagement of said vertical support members with said second cross member and the pivotable movement of said second cross member with respect to said frame member.

2. The automobile dolly defined in claim 1 further comprising:
- a mounting block adjustably locatable on the upper surfaces of said vertical support members, said mounting block having a vertically movable support pin biased to an upward extended position where the upper surface of said support pin is adapted to engage a predetermined location on said frame of said automobile when properly positioned with respect thereto, the lower end of said support pin engaging said predetermined locations on said vertical support members to retain said mounting block at said predetermined location; and
- spring means disposed in said mounting block for biasing said pin upwardly.

3. The dolly defined in claim 1 further comprising jack means carried by said dolly for raising both said dolly and said automobile a predetermined distance above the ground.

4. The dolly defined in claim 3 wherein said jack means is disposed on the bottom side of said cross member.

5. An automobile dolly for supporting the front end of a vehicle comprising:
- a frame member;
- a plurality of wheels;
- means for pivotally mounting the wheels to said frame member to permit movement of said frame member;
- handle means secured to said frame member to control the movement of said frame member;
- a cross member pivotally carried by said frame member for rotational movement about a vertical axis;
- a pair of vertical support members telescopically received in the opposite ends of said cross member to permit alignment of said vertical support members with a predetermined location on the frame of the vehicle to be supported by said dolly, alignment being had by the telescopic engagement of said vertical support members with said cross member and the pivotable movement of said cross member with respect to said frame member;
- a mounting block adjustably locatable on the upper surfaces of each vertical support member, said mounting block having a vertically movable support pin biased to an upward extended position where the upper surface of said support pin is adapted to engage a predetermined location on the frame of said vehicle when properly positioned with respect thereto, the lower end of said support pin engaging said predetermined locations on said vertical support members to retain said mounting block at said predetermined location;
- spring means disposed in said mounting block for biasing said pin upwardly; and
- jack means carried by said dolly for raising both said dolly and said vehicle a predetermined distance above the ground.

* * * * *